(12) United States Patent
Maziers

(10) Patent No.: US 8,463,017 B2
(45) Date of Patent: Jun. 11, 2013

(54) METHOD FOR MINIMISING SHRINKAGE AND WARPAGE IN ROTOMOULDING APPLICATIONS

(75) Inventor: Eric Maziers, Seneffe (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 603 days.

(21) Appl. No.: 12/664,096

(22) PCT Filed: Jun. 6, 2008

(86) PCT No.: PCT/EP2008/057066
§ 371 (c)(1),
(2), (4) Date: Jun. 3, 2010

(87) PCT Pub. No.: WO2008/151988
PCT Pub. Date: Dec. 18, 2008

(65) Prior Publication Data
US 2010/0262271 A1    Oct. 14, 2010

(30) Foreign Application Priority Data

Jun. 11, 2007  (EP) .................................. 07109981

(51) Int. Cl.
| G06K 9/00 | (2006.01) |
| B29D 22/00 | (2006.01) |
| B28B 7/22 | (2006.01) |
| C08F 8/00 | (2006.01) |

(52) U.S. Cl.
USPC ........... 382/152; 382/100; 382/154; 428/35.7

(58) Field of Classification Search
USPC . 382/152, 100, 143, 149, 154, 285; 428/35.7, 428/36.6, 523, 516, 483, 36.5; 264/310, 532, 264/255, 349, 328.8, 331.12, 537, 328.1, 264/45.7, 328.6; 525/191, 240, 49, 210, 28, 525/42, 43; 526/126, 170; 523/509, 508, 523/527, 466
See application file for complete search history.

(56) References Cited

U.S. PATENT DOCUMENTS 5,683,636 A * 11/1997 van der Spek et al. ...... 264/45.7
7,110,000 B2 * 9/2006 Zhang et al. .................. 345/582
7,161,601 B2 * 1/2007 Zhang et al. .................. 345/582
7,852,370 B2 * 12/2010 Peleg et al. ..................... 348/36

* cited by examiner

*Primary Examiner* — Sheela Chawan

(57) ABSTRACT

The present invention discloses a method for mapping and controlling the three-dimensional shrinkage and warpage occurring in rotomoulding applications.

14 Claims, 7 Drawing Sheets

METHOD FOR MINIMISING SHRINKAGE AND WARPAGE IN ROTOMOULDING APPLICATIONS

CROSS-REFERENCE TO RELATED APPLICATIONS

This application claims the benefit of PCT/EP2008/057066, filed Jun. 6, 2008, which claims priority from EP 07109981.6, filed Jun. 11, 2007.

The present invention discloses a method for predicting and thus controlling the three-dimensional deformations occurring in rotomoulding applications.

Rotomoulding is typically used in applications that require a complex and precise geometry. It is thus desirable to reduce the shrinkage and warpage to a maximum or at least to know where and how it is most likely to occur.

The warpage and shrinkage are typically studied using two-dimensional methods. Warpage is measured as the vertical distance between the plane horizontal surface under study and a fixed marker. This of course is not accurate if the surface under study has a complex shape.

Shrinkage is measured by inserting a grid of known dimension in the moulded part, but this is not accurate either as the grid partly blocks or at least interacts with the shrinkage process.

Last but not least a deformation measured on a two-dimensional system is far smaller than the resulting three-dimensional deformation.

LIST OF FIGURES

Warpage and shrinkage have been studied extensively at the Queens University in Belfast.

In the solid state, polymers such as polyethylene, polypropylene, polyamide, polyvinyl difluoride are characterised by a semi-crystalline structure comprising non-organised amorphous zones and highly organised crystalline zones. As a consequence of the higher level of organisation in the solid state than in the liquid state, the density of the polymer increases when passing from the liquid state to the solid state.

The level of crystallinity is determined by the chemical structure of the polymer and therefore by its method of preparation. It has been observed for example that the spherulite size of polyethylene prepared with a bis-tetrahydroindenyl catalyst system is smaller than that of a polyethylene prepared with a Ziegler-Natta catalyst system.

The shrinkage and warpage occurring in rotomoulding applications are tied to the crystallinity of the material that is itself linked to its thermal history.

It was observed that fast cooling was associated with the presence of a large amount of random or amorphous structures, low shrinkage and good impact whereas low cooling was associated with highly crystalline material presenting important shrinkage and poor impact.

Figure 1:
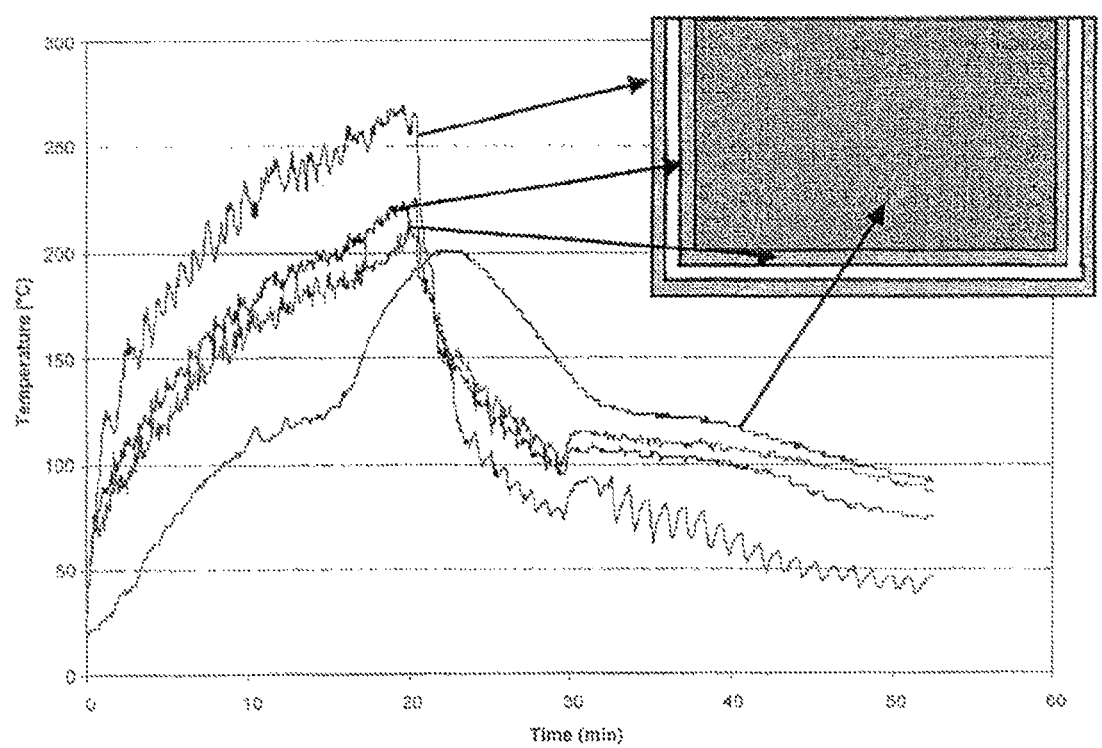
FIG. 1 represents the temperature expressed in ° C. in terms of time expressed in minutes in several parts of a multi-layer moulded part.
Figure 2:
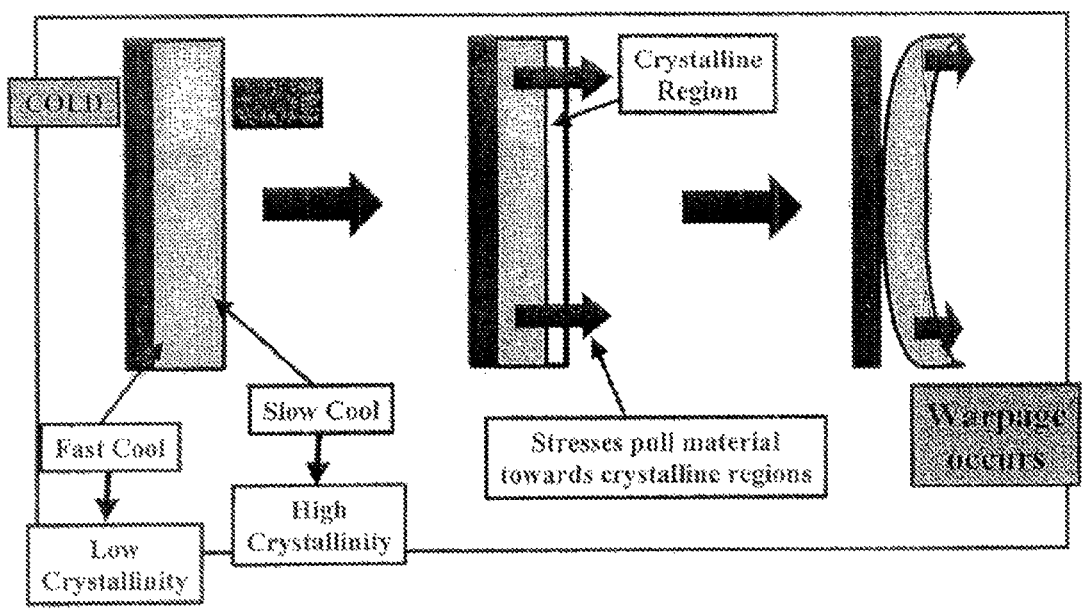
FIG. 2 is a schematic representation of warpage development.

It was also observed that thermal exchanges within the rotomoulding mould are not uniform as represented in FIG. 1. The differences in cooling rate occurring in various parts of the mould create tension inside the cooling solid resulting in warpage as represented in FIG. 2.

Deformations occurring in rotomoulded parts are thus the complex superposition of various effects influenced by different factors.

If deformations cannot be measured accurately, it is impossible either to control or to reduce their magnitude.

There is thus a need to develop a method that accurately measures the three-dimensional deformations occurring in rotomoulded parts and to understand the rotomoulding parameters that are responsible for said deformations.

It is an aim of the present invention to develop a method to measure the three-dimensional deformation of rotomoulded articles.

It is also an aim of the present invention to determine the parameters that are responsible for the deformations observed in rotomouldes articles.

It is another aim of the present invention to develop a method for minimising the deformations of rotomoulded articles.

Any one of these aims is, at least partially, fulfilled by the present invention.

Accordingly, the present invention discloses a method for minimising the shrinkage and warpage of rotomoulded parts that comprises the steps of:
 a) subjecting the external surface of the rotomoulded part to three-dimensional analysis by optical digitisation;
 b) subjecting the external and internal surfaces of the rotomoulded part to three-dimensional analysis by Rx digitisation;
 c) subjecting the internal surface of the mould to three-dimensional analysis by optical digitisation;
 d) subjecting the internal and external surfaces of the mould to three-dimensional analysis by Rx digitisation;
 e) keying the moulded part into the mould;
 f) mapping the volume between mould and moulded part point by point;
 g) creating a bank of maps using different resins;
 h) creating a bank of maps using different oven temperatures;
 i) creating a bank of maps using different cooling rates;
 j) selecting the parameters of steps g) and/or h) and/or i) that give the best balance of deformations.

Rx digitisation is computed tomography as used in medical domain, wherein tomography is imaging by sections. Digital geometry processing is used to generate a three-dimensional image of the inside of an object from a large series of two-dimensional X-ray images taken around a single axis of rotation. This method is used mostly in medicine but also for non-destructive materials testing.

The moulded part can be keyed to the mould using several techniques:
- The centre of gravity of the mould is keyed to that of the moulded part.
- A fixed point of the moulded part is keyed to the mould.
- The mean of the distances between mould and moulded part is minimised.

Figure 3:
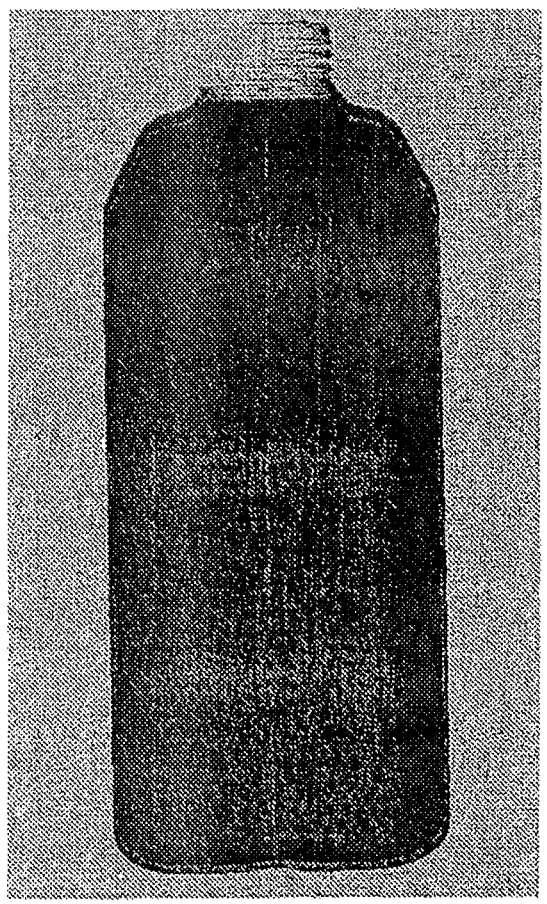
FIG. 3 represents configuration of the rotomoulded part in the mould.

The last method is preferably used. A typical configuration can be seen in FIG. 3.

Figure 4:
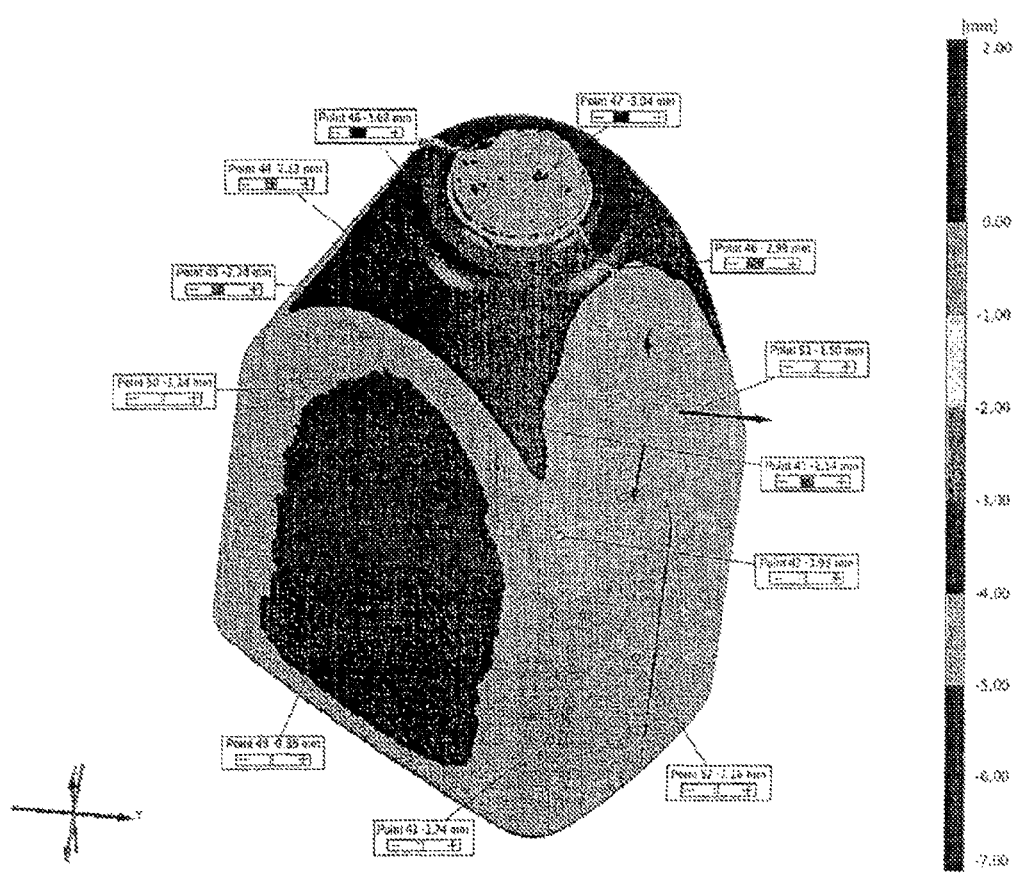
FIG. 4 represents a three-dimensional mapping of shrinkage for a 7.5 L rotomoulded bottle as measured by the spacing between the rotomoulded part and the mould wherein it has been configured in order to reduce the means of distances between mould and moulded part.

The three-dimensional mapping of the spacing between the rotomoulded part and the mould can be seen for example in FIG. 4.

EXAMPLES

Several resins were tested to prepare rotomoulded articles. The mould, oven temperature and cooling rate were the same for all resins.

The resins were as follows:

R1 was a metallocene-produced polyethylene sold by Total Petrochemicals under the name M3581 UV and having a density of 0.935 g/cm$^3$ and a melt flow index MI2 of 8 dg/min. The density is measured following the method of standard test ASTM 1505 at a temperature of 23° C. and the melt index MI2 is measured following the method of standard test ASTM D 1238 at a temperature of 190° C. and under a load of 2.16 kg.

R2 was resin R1 extruded with red pigments.
R3 was resin R1 extruded with white pigments.
R4 was a dry blend of resin R1 and black pigments.
R5 was a dry blend of resin R1 and green pigments.
R6 was a plyamide sold by Arkema under the name Rilsan® RDG232.
R7 was a metallocene-produced random copolymer of propylene having a melt index of 15 dg/min and an ethylene content of 2 wt %. The melt index was measured following the method of standard test ASTM D 1238 under a load of 2.16 kg and at a temperature of 230° C.
R8 was a PVDF sold by Arkema under the name Kynar® 3200G.
R9 was a metallocene-produced polyethylene sold By Total Petrochemicals under the name M4041 UV and having a density of 0.940 g/cm$^3$ and a melt flow index MI2 of 4 dg/min.
R10 was a polyethelene produced with a Ziegler-Natta catalyst system and having a density of 0.940 g/cm$^3$ and a melt flow index MI2 of 4 dg/min.
R11 was a metallocene-produced polyethylene sold by Borealis under the name RM8343 and having a density of 0.934 g/cm$^3$ and a melt flow index MI2 of 6 dg/min.

Figure 5:
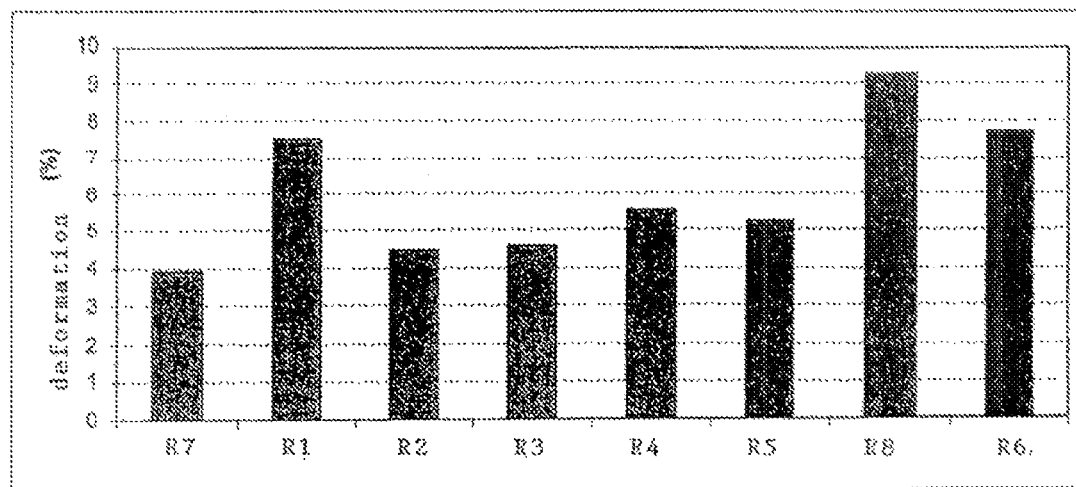
FIG. 5 represents global deformation expressed in % with respect to the mould volume for resins R1 to R8.

The overall deformation, that is a combination of shrinkage and warpage, is expressed in % with respect to the mould inner volume. It is exemplified in FIG. 5 for resins R1 to R8. As can be seen, the nature of the resin, the nature of the additive and the method of additivation play a role in the overall performance of the moulded part.

In a next example the level of crystallisation, expressed by spherulite size, was studied in terms of the nature of the resin and of the oven temperature. The results are represented in FIG. 6.

Figure 6:
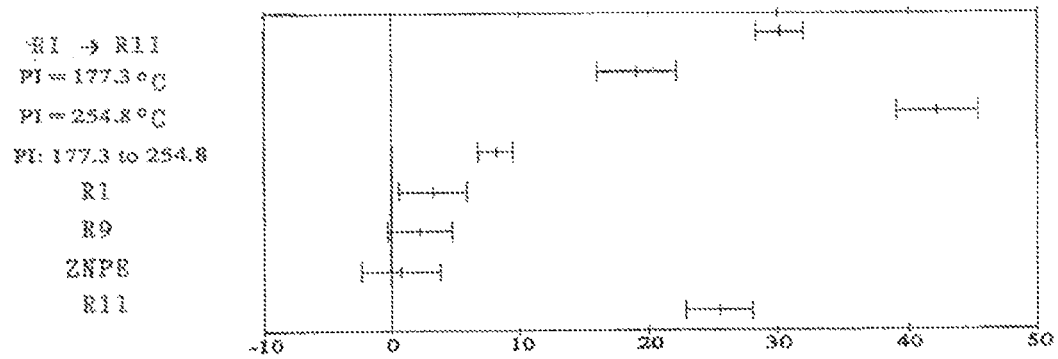
FIG. 6 represents the spherulite size expressed in μm as a function of resin type and peak internal air temperature.

The first row of FIG. 6 represents the overall change in spherulite size when changing the resin type from second generation metallocene (resins R1 or R9) to first generation metallocene resin (resin R11) under various peak inernal air temperatures (PIAT). The overall change was an increase of about 30 μm.

The second row represents the change in spherulite size when changing the resin type from second generation metallocene (resins R1 or R9) to first generation metallocene resin (resin R11) for a PIAT of 177.3° C. The change was an increase of about 19 μm.

The third row represents the change in spherulite size when changing the resin type from second generation metallocene (resins R1 or R9) to first generation metallocene resin (resin R11) for a PIAT of 254.8° C. The change was an increase of about 42 μm.

The fourth row represents the overall change in spherulite size when increasing the PIAT from 177.3 to 254.8° C. for all types of resins. The change was an increase of about 9 μm.

The fifth row represents the change in spherulite size when increasing the PIAT from 177.3 to 254.8° C. for resin R1. The change was an increase of about 4 μm. The sixth row represents the change in spherulite size when increasing the PIAT from 177.3 to 254.8° C. for resin R9. The change was an increase of about 3 μm.

The seventh row represents the change in spherulite size when increasing the PIAT from 177.3 to 254.8° C. for a Ziegler-Natta polyethylene. The change was an increase of about 2 μm.

The eighth row represents the change in spherulite size when increasing the PIAT from 177.3 to 254.8° C. for resin R11. The change was an increase of about 26 μm.

It can thus be concluded that the major factors influencing the spherulite size is the nature of the resin. Resins R1 and R9, prepared with "second generation" metallocene catalyst systems such as bis-tetrahydroindenyl, typically had a very stable spherulite size with respect to PIAT. Resin R11 prepared with "first generation" metallocene catalyst systems such as unbridged biscyclopentadienyl was very sensitive to PIAT.

Figure 7:
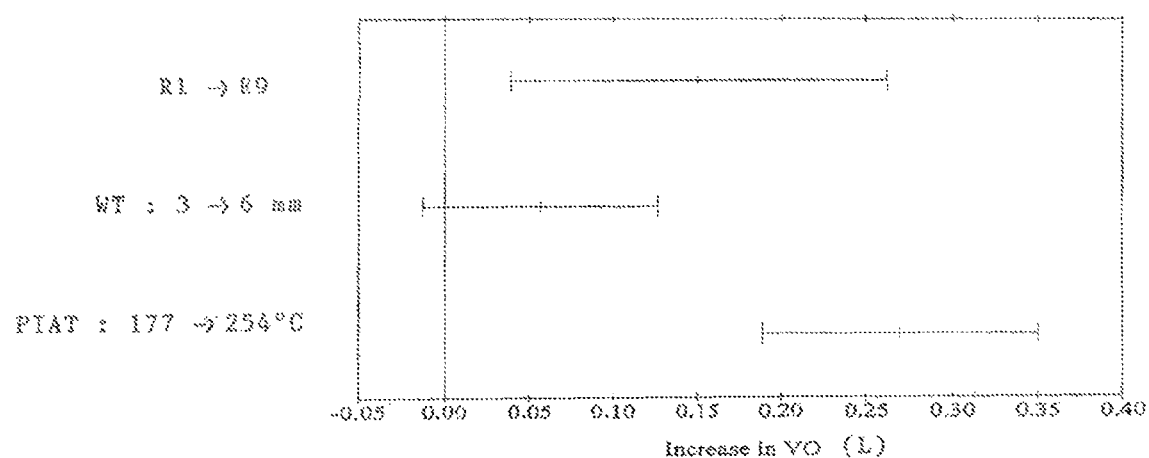
FIG. 7 represents the increase in volume of the rotomoulded part expressed in litres for different resins, for different wall thicknesses and for different oven temperatures.

The total volume of the moulded part was also studied for several mould thicknesses, oven temperatures and cooling rates. If the total volume of the rotomoulded part increases, it means that shrinkage decreases. The samples were 7.5 L rotomoulded bottles It was observed that shrinkage decreased with increasing mould thickness and with increasing oven temperature as represented in FIG. 7.

The first row represents the increase in volume of the moulded part, expressed in L, when changing from resin R9 to resin R1.

The second row represents the increase in volume when the wall thickness (WT) of the moulded part increased from 3 to 6 mm.

The third row represents the increase in volume of the moulded part when the PIAT increased from 177.3 to 254.8° C.

In another example a 10 L. bottles were prepared by rotomoulding with resin M3423 UV® having a density of 0.934 g/cc and a melt flow index MI2 of 2.7 dg/min. They had a wall thickness of 4.5 or of 6.0 mm. These bottles were filled either with pure biodiesel or with 30% biodiesel and stored for 6 weeks at a temperature of 70° C. The wall thicknesses and the outside surface dimensions were measured by tomography using 200,000 measurement points, before and after soaking. It has been surprisingly observed that, although some diesel was absorbed in the bottles' walls, the overall wall thickness decreased after soaking. The results for mean wall thickness, expressed in mm are summarised in Table I

TABLE I

| Biodiesel 30% before | Biodiesel 30% after | Biodiesel pur before | Biodiesel pur after |
|---|---|---|---|
| 4.342 | 4.328 | 4.359 | 4.326 |
| 5.968 | 5.968 | 5.983 | 5.944 |

Figure 8:
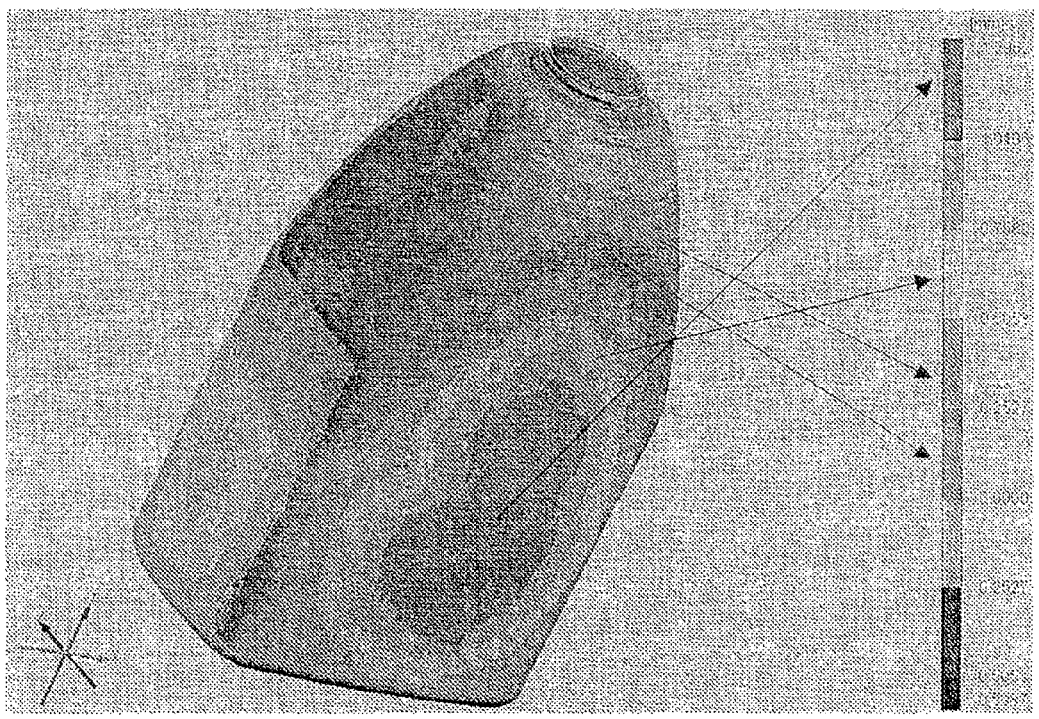
FIG. 8 represents the change in outer surface dimensions for 10 L. bottles having a wall thickness of 4.5 mm, before and after soaking, using 200,000 measurement points. The change of outer surface dimensions is expressed in mm.

The results for outside surface dimension are represented in FIG. 8. In this figure, it can be seen that the outside surface dimensions of the bottle increased after soaking.

The invention claimed is:

1. A method for minimizing shrinkage and warpage of rotomoulded parts comprising:
   subjecting an external surface of a rotomoulded part to three-dimensional analysis by optical digitisation;
   subjecting the external surface and an internal surface of the rotomoulded part to three-dimensional analysis by Rx digitization;
   subjecting the internal surface to three-dimensional analysis by optical digitisation;
   subjecting the internal and external surfaces to three-dimensional analysis by Rx digitisation;
   keying the rotomoulded part into the mould;
   mapping a volume between the mould and rotomoulded part point by point;
   creating banks of maps for parameters by:
      creating a bank of maps using different resins:
      creating a bank of maps using different oven temperatures; and
      creating a bank of maps using different cooling rates; and
   selecting the parameters of creating a hank of maps that give a predetermined level of deformations, wherein Rx digitisation comprises computed tomography.

2. The method of claim 1, wherein the keying the rotomoulded part is carried out by minimising a mean of the distances between the mould and the rotomoulded part.

3. The method of claim 1, wherein the different resin comprise a polyethylene produced with a bis-tetrahydroindenyl catalyst system.

4. the method of claim 1, wherein Rx digitisation comprises generating a three-dimensional image from a series of two-dimensional images taken around a single axis of rotation using digital geometry processing.

5. The method of claim 4, wherein the two-dimensional images are two-dimensional X-ray images.

6. The method of claim 1, wherein keying the rotomoulded part is carried out by keying the center of gravity of the mould to the center of gravity of the rotomoulded part.

7. The method of claim 1, wherein keying the rotomoulded part is carried out by keying a fixed point of the rotomoulded part to the mould.

8. A method for minimizing shrinkage and warpage of rotomoulded parts comprising:
   subjecting an external surface of a rotomoulded part to three-dimensional analysis by optical digitisation;
   subjecting the external surface and an internal surface of the rotomoulded part to three-dimensional analysis by Rx digitisation;
   subjecting the internal surface to three-dimensional analysis by optical digitisation;
   subjecting the internal and external surfaces to three-dimensional analysis by Rx digitisation;
   keying the rotomoulded part into a mould;
   mapping a volume between the mould and the rotomoulded part point by point;
   creating banks of maps for parameters that are responsible for deformations in the rotomoulded part; and
   selecting the parameters from the banks of maps that give a predetermined level of deformations in the rotomoulded part, wherein Rx digitisation comprises computed tomography.

9. The method of claim 8, wherein the banks of maps for parameters comprise:
   a bank of maps using different resins;
   a bank of maps using different oven temperatures; and
   a bank of maps using different cooling rates.

10. The method of claim 8, wherein Rx digitisation comprises generating a three-dimensional image from a series of two-dimensional images taken around a single axis of rotation using digital geometry processing.

11. The method of claim 8, wherein the two-dimensional images are two-dimensional X-ray images.

12. A method for minimizing shrinkage and warpage of rotomoulded parts comprising:
   subjecting an external surface of a rotomoulded part to three-dimensional analysis by optical digitisation;
   subjecting the external surface and an internal surface of the rotomoulded part to three-dimensional analysis by Rx digitisation, wherein Rx digitisation comprises generating a three-dimensional image from a series of two-dimensional images taken around a single axis of rotation and wherein Rx digitisation comprises computed tomography;
   subjecting the internal surface to three-dimensional analysis by optical digitisation;
   subjecting the internal and external surfaces to three-dimensional analysis by Rx digitisation;
   keying the rotomoulded part into a mould;
   mapping a volume between the mould and the rotomoulded part point by point;
   creating banks of maps for parameters that are responsible for deformations in the rotomoulded part; and
   selecting the parameters from the banks of maps that give a predetermined level of deformations in the rotomoulded part.

13. The method of claim 12, wherein the banks of maps for parameters comprise:
   a bank of maps using different resins;
   a bank of maps using different oven temperatures; and
   a bank of maps using different cooling rates.

14. The method of claim 12, wherein the two-dimensional images are two-dimensional X-ray images.

* * * * *